United States Patent [19]

Giuffrida

[11] Patent Number: 4,647,806
[45] Date of Patent: Mar. 3, 1987

[54] BRUSHLESS ALTERNATOR

[76] Inventor: Giovanni Giuffrida, 65-59 Maurice Ave., Woodside, N.Y. 11377

[21] Appl. No.: 742,979

[22] Filed: Jun. 10, 1985

[51] Int. Cl.[4] .............................................. H02K 47/04
[52] U.S. Cl. .................................... 310/68 D; 310/112
[58] Field of Search ....................... 310/68 D, 112, 113, 310/168, 180, 257, 263; 322/87

[56] References Cited

U.S. PATENT DOCUMENTS

| | | | |
|---|---|---|---|
| 3,010,040 | 11/1961 | Braun | 310/112 |
| 3,034,035 | 5/1962 | Baumann et al. | 310/68 D |
| 3,132,296 | 5/1964 | Nippes | 322/90 |
| 3,401,328 | 9/1968 | Hartung | 322/73 |
| 3,412,271 | 11/1968 | Hall | 310/71 |
| 3,602,747 | 8/1971 | Stroppa | 310/68 D |
| 3,702,965 | 11/1972 | Drexler et al. | 310/68 D |
| 3,771,046 | 11/1973 | Harter | 322/63 |
| 4,041,339 | 8/1977 | Huber et al. | 310/239 |
| 4,059,778 | 11/1977 | Sohnle | 310/68 D |

FOREIGN PATENT DOCUMENTS 832698 9/1938 France ................................ 310/112

Primary Examiner—Patrick R. Salce
Assistant Examiner—D. L. Rebsch
Attorney, Agent, or Firm—Collard, Roe & Galgano

[57] ABSTRACT

A brushless alternator consisting of interconnected stator coils disposed in stator plates and surrounding the main winding of the rotor and including rectifiers coupled to the stator coils. The rotor is on a shaft supported within the housing of the alternator, and includes an exciter with shaft-mounted rectifiers for supplying a DC voltage to the main winding of the rotor. The exciter field coil is spool wound on a cylindrical core that is contained within the exciter stator, that is attached to the alternator housing. The field coil has a concentric opening for slidably receiving the rotor shaft. The exciter rotor armature does not rotate, but is affixed to the alternator housing and surrounds the outer periphery of the exciter field coil. The main winding of the rotor has a cylindrical sleeve extending from one end to engage and support the exciter rotor armature in alignment with the exciter stator.

7 Claims, 3 Drawing Figures

BRUSHLESS ALTERNATOR

BACKGROUND OF THE INVENTION

This invention relates to a brushless alternator. More specifically, it relates to an improved high-performance brushless alternator of the type having a separate exciter and rectifiers for providing a DC voltage to an alternator field winding.

The use of brushes in electricity generating equipment has several disadvantages. Initially, brushes tend to wear quickly and have a relatively short lifespan in comparison to the equipment itself. If a generator is installed in a location which prohibits easy access, it can become quite burdensome to maintain the equipment by replacing or cleaning the brushes. The use of brushes requires that the equipment be serviced regularly, whereas brushless equipment can run for substantially longer periods of time, without attention. In addition, brushes produce sparks. This prohibits their use in explosive atmospheres. The sparking can also create electromagnetic interference problems. Manufacturers have developed brushless generators to overcome these drawbacks. However, these brushless type generating devices are relatively inefficient in current output, for their size and weight, in comparison to equivalent brush generators. Some prior art brushless alternators are disclosed in U.S. Pat. Nos. 3,771,046; 3,132,296; 3,401,328; 4,041,339; 4,059,778; 3,412,271; and 1,584,253. The exciters in several of the known brushless devices are of inefficient design, resulting in limited excitation current available to the generator field coil. This relatively low excitation current capability decreases the overall generator efficiency, and also creates voltage regulation problems, particularly when the generator is heavily loaded.

Bauman et al, U.S. Pat. No. 3,034,035, describes a brushless alternator having exciter and rotor field windings combined on a single rotor. This design has the same disadvantage as conventional brushless machines in that it does not provide a large exciter-to-armature current gain. In addition, since a single set of armature plates is used for both the main and exciter coils, early saturation of the armature occurs, and therefore the output of the brushless machine is limited.

The alternator in the Braun U.S. Pat. No. 3,010,040 uses only a single pole of an exciter coil which provides only a limited coupling and current output.

Accordingly, it is an object of the present invention to provide an improved brushless alternator having high current output, while being relatively compact and lightweight.

It is also an object of the invention to provide such a brushless alternator which is of simple and economical manufacture and which is reliable in operation.

SUMMARY OF THE INVENTION

Certain of the foregoing and related objects are readily attained in a brushless alternator having a three-phase stator winding, consisting of at least one set of delta connected stator coils disposed in stator plates and surrounding the main field winding in the rotor. The rotor is disposed on a shaft rotatably supported within the housing of the alternator. An exciter and shaft-mounted rectifying means are provided for supplying DC voltage to the main winding of the rotor. The exciter field coil is wound spool-like on a core, with the field coil contained within an exciter stator attached to the alternator housing. The main winding in the rotor is wound spool-like on a core with the rotor having a cylindrical sleeve extending from one end and engaging and supporting the exciter armature in alignment with the exciter stator.

The exciter produces a three-phase AC voltage which is rectified by diodes mounted to and rotating with the alternator shaft. The rectified voltage is supplied to a main field winding disposed within the rotor mounted onto the shaft. This, in turn, provides a DC current flow in the main field winding, which is required for inducing the altnerator output current, in a main armature winding. The exciter and main field windings are wrapped sequentially and annularly around their respective cores. The exciter armature is attached to and partially enclosed within a cylindrical flange extending outward from the rotor. The exciter field coil is disposed within and surrounded on its sides by the exciter armature.

A feedback circuit is provided within the alternator in order to maintain output voltage during varying load and temperature conditions. Within the stator is a set of feedback coils in a three-phase delta connection. The output voltage from these coils is rectified and supplied to a voltage regulator, as shown in FIG. 3. When the battery voltage deviates beyond the working range, the voltage regulator compensates by supplying a correspondingly higher or lower DC voltage to the field coil in the exciter stator, as required. This, in turn, results in the desired change of output voltage.

Other objects of the present invention will become apparent from the following detailed description when taken in connection with the accompanying drawings which disclose one embodiment of the invention. It is to be understood that the drawings are designed for the purpose of illustration only and are not intended as a definition of the limits of the invention.

BRIEF DESCRIPTION OF THE DRAWINGS

In the drawings, wherein similar reference characters denote similar elements throughout the several views:

Referring to FIGS. 1–3, there is shown a novel brushless alternator embodying the present invention, having a rotor assembly 4, consisting of an exciter armature 11, having a plurality of coils 12, 13, 14 and a diode rectifier plate (not shown), and a main field winding 17, all affixed to shaft 2. One end of shaft 2 is shown passing through bearing 3 (FIG. 2). The opposite end of shaft 2 is rotatably supported on a bearing in housing 1. The stator 7 preferably consists of a plurality of laminated, stamped-out stator plates which are generally constructed of steel, and include a plurality of stator teeth, for receiving the stator windings 18, 19, 20, as is well known in the state of the art. Stator plates surround rotor 4. Main field winding 17 disposed within the rotor is tightly wrapped, spool-like, on a core which is attached to shaft 2. The coil 17 preferably completely fills the space within the main rotor to maximize the ampere-turns of the rotor.

Figure 1:
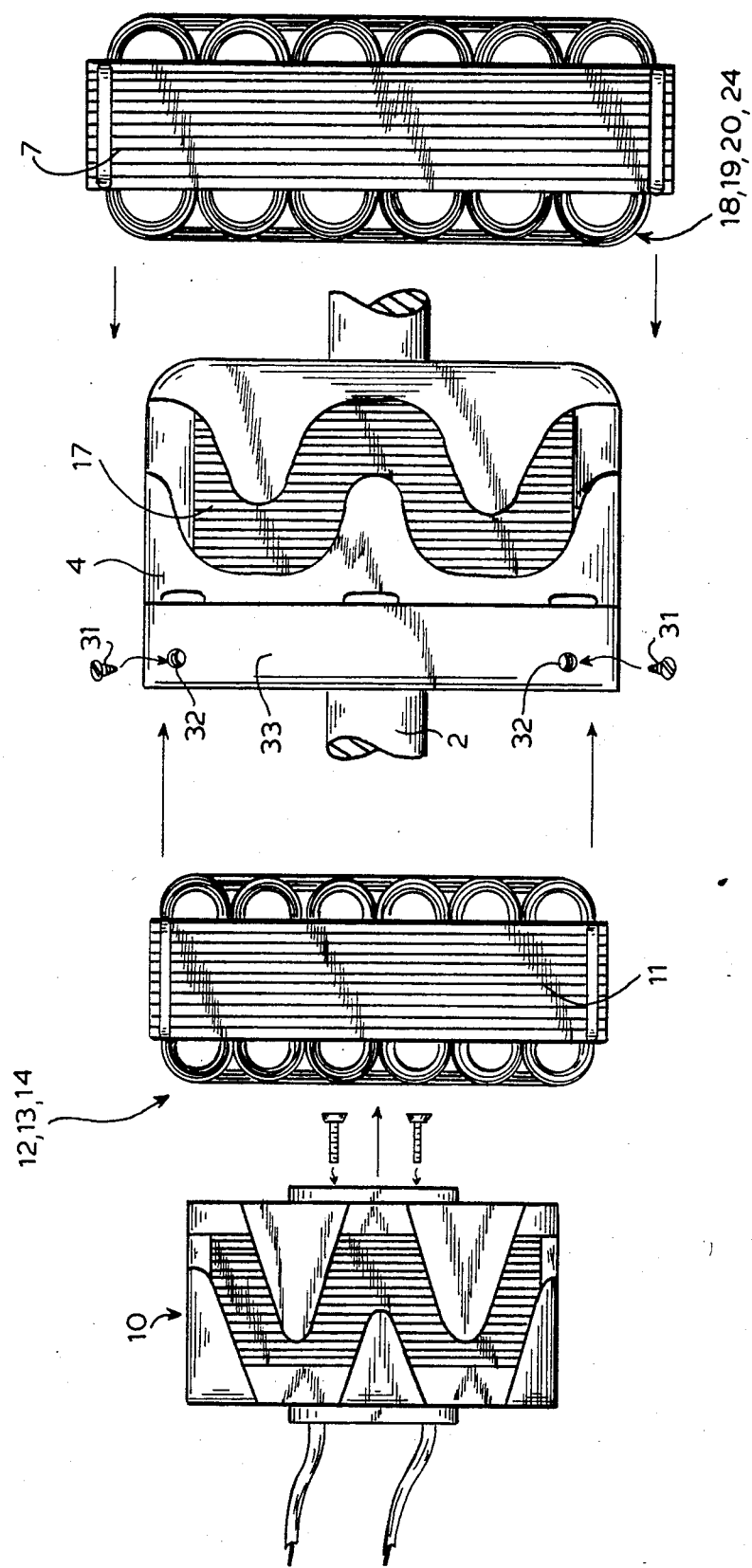
FIG. 1 is a front elevational exploded schematic view of the novel brushless alternator, embodying the present invention.
Figure 2:
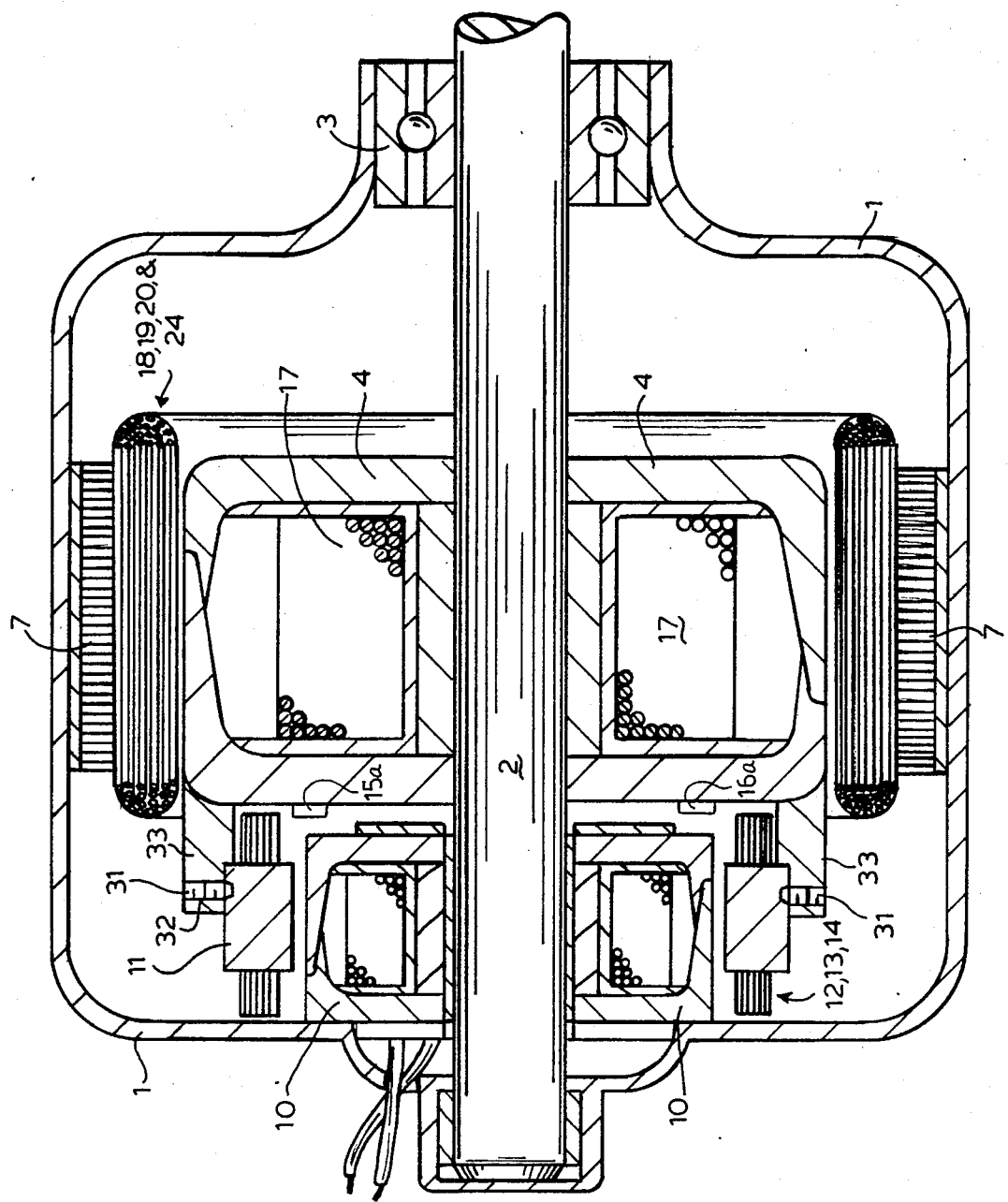
FIG. 2 is a front elevational sectional schematic view of the alternator in a fully assembled state.

Stator windings 18, 19 and 20 are in a three-phase delta connection. Each of these windings 18, 19 and 20 includes six insulated No. 15 wires. These wires are joined together in a known manner, effectively into three leads, where they emerge from the stator, therein forming the three-phase delta connection. These leads supply three-phase AC current to the full wave output rectifiers 21, 22 which, in turn, supply DC to the battery and/or the load.

Each phase 18, 19 and 20 is wound as three sets of coils. Thus, the three coils of 18 are in parallel and disposed in every third slot of the stator. Likewise, the three coils of 19 are wound on every next third slot of the rotor adjacent to every third slot containing the three coils of winding 18. The nine coils of windings 18, 19 and 20 fill all of the stator slots and are connected at their ends to form the three-phase delta terminals of the alternator.

Exciter armature 11 is mounted in front of rotor 4 by means of set screws 31 disposed in threaded holes 32 through the front flange 33 of the rotor. Armature 11 consists of a laminated slotted core having a plurality of windings 12, 13 and 14, which are coupled through the slots to form a three-phase delta-connection. The slotted exciter armature 11 is preferably constructed of lamination plates that are sandwiched together.

Each phase of the exciter has one coil, and each coil is wound in every third slot of the exciter. The three coils 12, 13 and 14 are connected at their ends in a three-phase delta connection on the armature.

Figure 3:
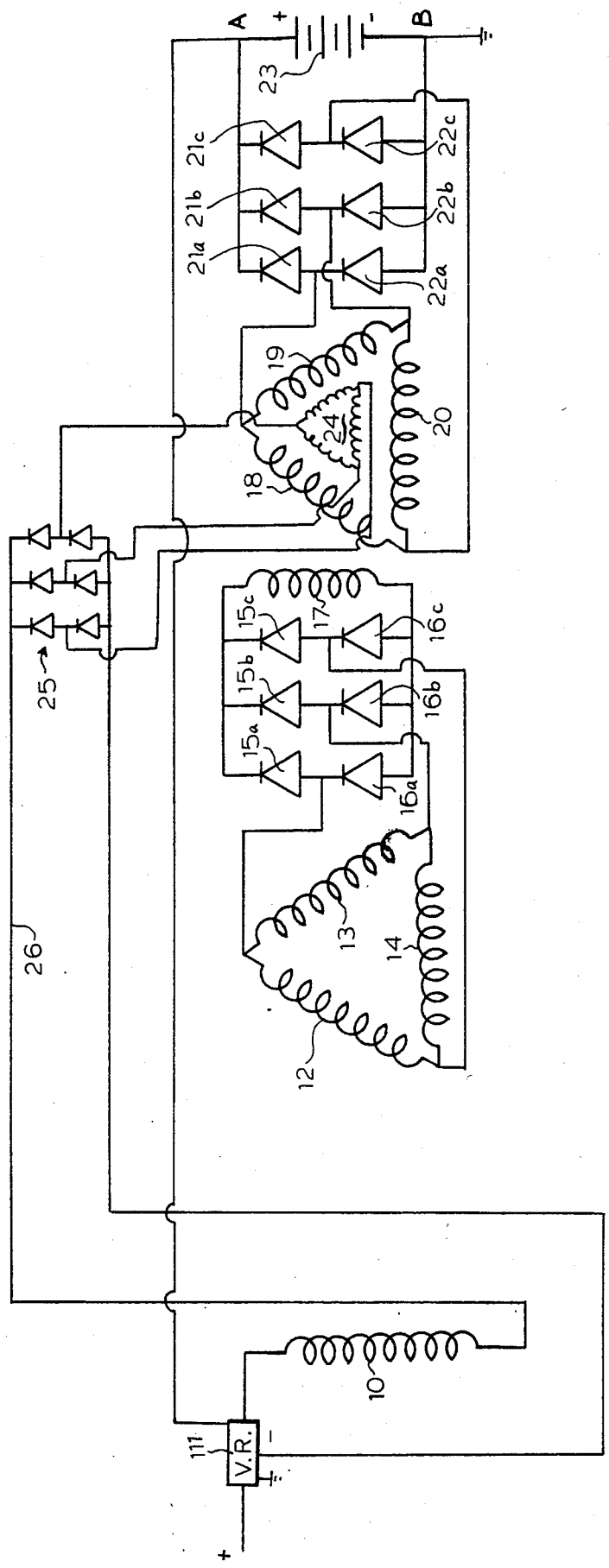
FIG. 3 is an electrical schematic diagram embodying the present invention.

As shown in more detail in FIG. 3, each of exciter armature windings 12, 13 and 14 are connected to rectifiers 15a, b and c and 16a, b and c, to comprise a full wave rectifier, and are mounted on a diode ring (not shown). The three-phase outputs of each of rotor coils 12, 13 and 14 are fully rectified by rectifiers 15 and 16, and the output from the rectifiers is supplied to main field winding 17.

Exciter stator 10 contains a single spool-like coil tightly wrapped around a core. The coil is energized by a feed back circuit of stator 7. Shaft 2 passes through an opening in exciter stator 10, which is attached to housing 1. When assembled, exciter stator 10 is disposed directly in alignment with exciter rotor 11, in order to maximize the coupling of magnetic lines of flux. The stator coil preferably completely fills the space within the body of the stator to maximize the ampere-turns of the exciter.

In the feedback circuit, a three-phase delta-connected winding 24 is disposed within stator 7, and supplies three-phase AC voltage to full wave rectifier assembly 25 wherein the three-phase AC is converted to DC. This DC voltage is provided to a voltage regulator 111, which controls the exciter field strength. When the alternator output voltage drops below a predetermined working voltage range, e.g., due to a load increase, voltage regulator 111 detects the difference between the now lower alternator output voltage, and the DC voltage provided by rectifier assembly 25. Voltage regulator 111 then accordingly compensates by increasing the exciter field voltage thereby causing the alternator output voltage to rise back into the working range. The feedback circuit similarly operates in a reverse manner to prevent the alternator output voltage from exceeding the desired value.

The spool-like exciter stator and main rotor coils allow the volume within the alternator to be used very efficiently, as open spaces and voids are reduced. The number of effective ampere-turns in both the exciter and main winding is therefore maximized. This advantage allows the alternator to be highly efficient. A large current output is therefore available from a relatively compact and lightweight machine.

There is no known prior art apparatus which has this advantage. The Baumann and Braun devices both show exciter windings "of the usual construction." Due to the novel design and very close magnetic linkage of the exciter stator and armature, superior electrical performance is possible. Previously, alternators of this size (approximately a $6\frac{1}{2}$ inch diameter housing, a $4\frac{3}{4}$ inch diameter rotor, and a housing length of about 8 inches) had maximum current outputs of about 110A at 14 VDC. Tests conducted on the present invention show a current output of 211A at 14VDC with a 2.6A exciter field current and a shaft speed of 4000 RPM. This performance approaches a level twice that which would normally be expected in similar sized alternators, such as Leece-Neville 8509, service part no. 4200B8, Model A 0014200BA capable of only 100 amps, and Delco Remy series 25-Sa, type 400, Model 111725 capable of 100 amps.

Thus, while only one embodiment of the present invention has been shown and described, it is obvious that many changes and modifications may be made thereunto, without departing from the spirit and scope of the invention.

What is claimed is:

1. In a brushless alternator, having a three-phase stator winding, consisting of interconnected stator coils disposed in stator plates and surrounding the main winding of the rotor and having rectifying means coupled to said stator coils, the rotor being disposed on a shaft rotatably supported within the housing of the alternator, and an exciter and shaft-mounted full wave rectifying means for supplying DC voltage to the main winding of the rotor, the improvement comprising:

an exciter field coil wound spool-like on a cylindrical core, said field coil contained within an exciter stator attached to the alternator housing said coil having a concentric opening for slidably receiving the rotor shaft;

an exciter rotor armature comprising a laminated slotted rotor core having a three-phase winding, said core surrounding the outer periphery of said exciter field coil; and a main winding of the rotor wound spool-like on a core, the rotor having a flange extending from one end of said main rotor winding and coupled to said exciter rotor armature in order to reduce the open spaces and voids within the alternator and to maintain a close coupling between the exciter rotor and the exciter stator.

2. The brushless alternator as recited in claim 1, wherein the stator winding additionally comprises a second three-phase interconnected coil disposed within the stator plates, second rectifying means coupled to the output of said second fullwave three-phase coil, and voltage regulator means coupled to the output of said second rectifying means and the rectified output of said stator coils and coupled to said exciter field coil, for regulating the current in said exciter field coil in response to changes in the rectified voltage of said stator field coils.

3. The brushless alternator as recited in claim 2, whrein said stator winding is delta connected.

4. The brushless alternator as recited in claim 3, wherein said exciter armature is delta connected.

5. The brushless alternator as recited in claim 4, wherein said exciter rotor armature comprises three excitation coils wherein each coil is disposed in every third slot of said excitation armature, wherein said coils are connected in a three phase delta connection on said armature.

6. The brushless alternator as recited in claim 5, wherein said stator comprises a three-phase winding wherein each winding has three coils in parallel and wherein each of the three parallel coils of each winding are disposed in every third stator slot, and the ends of the winding coils are connected in a three-phase delta connection.

7. The brushless alternator as recited in claim 1, wherein said rotor flange comprises set screws for securing said armature exciter to said rotor.

* * * * *